United States Patent [19]

Hirose et al.

[11] Patent Number: 4,736,441

[45] Date of Patent: Apr. 5, 1988

[54] POSTAL MATERIAL READING APPARATUS

[75] Inventors: Nobuyuki Hirose, Yokohama; Naoki Ota, Kawasaki, both of Japan

[73] Assignee: Kabushiki Kaisha Toshiba, Kawasaki, Japan

[21] Appl. No.: 905,155

[22] Filed: Sep. 9, 1986

Related U.S. Application Data

[62] Division of Ser. No. 854,570, Apr. 22, 1986.

[30] Foreign Application Priority Data

May 31, 1985 [JP] Japan .............................. 60-118145

[51] Int. Cl.⁴ .............................................. G06K 9/20

[52] U.S. Cl. .......................................... 382/48; 382/1; 382/9; 209/584; 209/900

[58] Field of Search ..................... 382/1, 9, 48, 46, 14, 382/49; 209/584, 900; 235/494, 456, 485, 474, 491

[56] References Cited

U.S. PATENT DOCUMENTS

| | | | |
|---|---|---|---|
| 3,868,478 | 2/1975 | Zeenkov | 358/93 |
| 3,912,909 | 10/1975 | Harrison | 235/436 |
| 4,513,390 | 4/1985 | Walter | 364/900 |
| 4,516,264 | 5/1985 | Corvari | 382/46 |
| 4,516,265 | 5/1985 | Kizu | 382/1 |
| 4,520,932 | 6/1985 | Matsuda | 209/900 |
| 4,558,461 | 12/1985 | Schlang | 382/48 |
| 4,652,730 | 3/1987 | Marshall | 235/456 |
| 4,691,100 | 9/1987 | Kizu et al. | 250/223 R |

FOREIGN PATENT DOCUMENTS

| | | | |
|---|---|---|---|
| 0060576 | 4/1984 | Japan | 382/46 |

*Primary Examiner*—David K. Moore
*Assistant Examiner*—A. A. Skinner
*Attorney, Agent, or Firm*—Finnegan, Henderson, Farabow, Garrett & Dunner

[57] ABSTRACT

A postal materal reading apparatus is provided with a mechanism for obtaining an image signal which represents a visual image of the surface of postal material. A detector is provided responsive to that image signal for identifying an area of that image which contains an edge mark that may interfere with orientation analysis of the image. A detector is also provided responsive to the identification of that area for analyzing the image signal for only that portion of the image signal which represents the image outside the area in which the edge mark was detected, to determine the orientation of the postal material. In the preferred embodiment, a histogram is used to identify the area of the image which contains the potentially interfering edge mark.

3 Claims, 10 Drawing Sheets

POSTAL MATERIAL READING APPARATUS

This is a division of application Ser. No. 854,570 filed Apr. 22, 1986.

BACKGROUND OF THE INVENTION

I. Field of the Invention

This invention relates to a reading apparatus which may be used to determine the orientation of postal material such as envelopes; namely to determine if the envelope is facing down, up, reverse or obverse.

II. Background of the Invention

In recent years, with the development of character reading apparatus, the sorting of postal material has become increasingly automated. Postal material as collected at a Post Office faces in all different directions. Before this material can be fed into a sorting machine the material must be sent through an alignment/stamping machine for aligning the direction in which the material faces.

Postal material from some countries has been standardized in various ways, but non-standardized material presents numerous problems. Conventional alignment/-stamping machines for dealing with standardized postal materials detect airmail mark location, stamp location and/or envelope flap orientation, and determine the side of the material with the stamp and airmail mark to be the obverse and the side of the material with the envelope flap to be the reverse. Also, based on the position of the airmail mark and the stamp, the material may be determined to be upside down or right side up. Accurate detection of the airmail mark, stamp, envelope flap and the like is therefore crucial to accurate determination of the orientation of the postal material containing that airmail mark, stamp and envelope flap.

In general, in addition to the airmail marks, edge marks such as red and blue diagonal stripes located alternatingly at equal intervals around the edge of the envelope are used to indicate that postal material is airmail. The airmail marks used to determine postal material orientation, may be located to overlap the striped edge airmail marks. Stamp may also be located to at least partially overlap the edge marks. This overlapping of airmail marks and edge marks and of stamps and edge marks at times makes the airmail mark and the stamp impossible to distinguish from those edge marks and, therefore, impossible to detect.

SUMMARY OF THE INVENTION

An object of the invention is to provide a reading apparatus that can accurately determine the reverse/obverse of postal material and determine whether the postal material is right side up or upside down, in spite of partial overlapping of an edge mark with marks which are critical to these determinations.

This object is achieved with a reading apparatus comprising means for obtaining an image signal which represents a visual image of the surface of postal material; means, responsive to that image signal, for identifying an area of that image which contains a mark that may interfere with an orientation analysis of that image; and means, responsive to identification of that area, for analyzing the image signal, for only that portion of the image signal which represents the image outside the identified area, to determine the orientation of the postal material.

Preferably, the means for identifying comprises means for calculating a histogram for a portion of the postal material along an edge of the postal material wherein the interfering mark is to be located, the histogram having peaks indicative of detection of the interfering mark; means for determining the heights and locations of the peaks; and means for comparing the locations of the peaks with characteristic reference locations to determine if the detected mark is, in fact, located at those characteristic locations. It is further preferable that the means for identifying includes means for determining the height of the area to be masked as a function of the heights of the histogram peaks.

BRIEF DESCRIPTION OF THE DRAWINGS

This invention may be better understood with reference to the drawings in which.

DETAILED DESCRIPTION OF THE PREFERRED EMBODIMENTS

The preferred embodiments of the reading apparatus of this invention are described with reference to the drawings. In the preferred embodiments, the postal materials whose orientations are to be determined are airmail envelopes.

Figure 1:
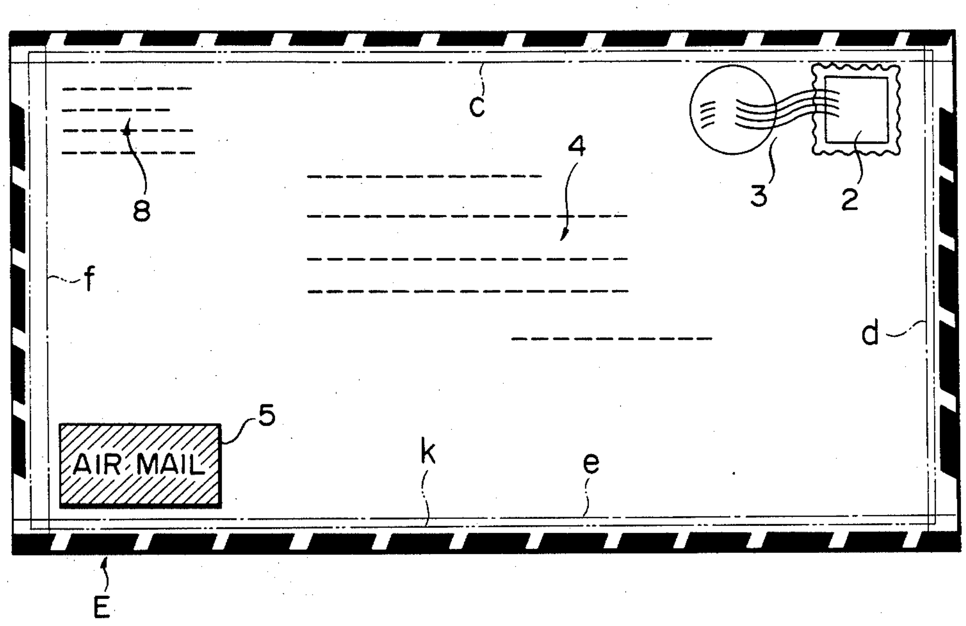
FIG. 1 shows an example of the obverse of an airmail envelope which is an example of postal material to be read by the reading apparatus of the subject invention.
Figure 2:
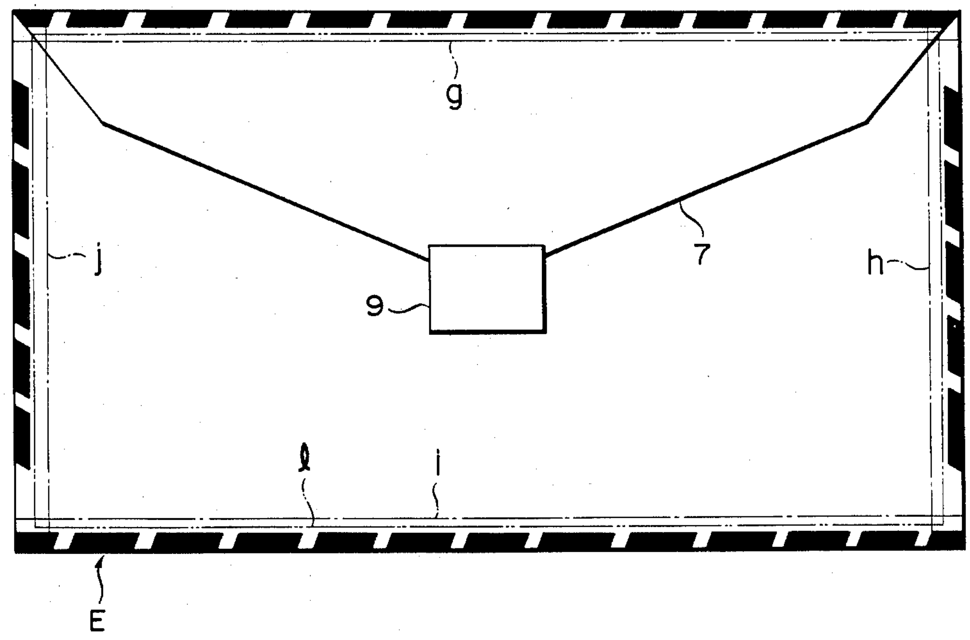
FIG. 2 shows an example of the reverse of an airmail envelope.

FIGS. 1 and 2 show the obverse (front) and reverse (back) of an airmail envelope. On the obverse of the envelope there are a stamp 2, cancellation stamp 3, address 4, airmail mark 5 and return address 8. Stamp 2 is in the upper right hand corner, airmail mark 5 is in the lower left hand corner printed in blue ink and return address 8 is in the upper left hand corner. Flap 7 and seal 9 for sealing flap 7 are located on the reverse of the envelope. Characteristic airmail edge marks E of red and blue diagonal alternating stripes (hereinafter called edge marks) are printed around the peripheral edge of the envelope.

Figure 3:
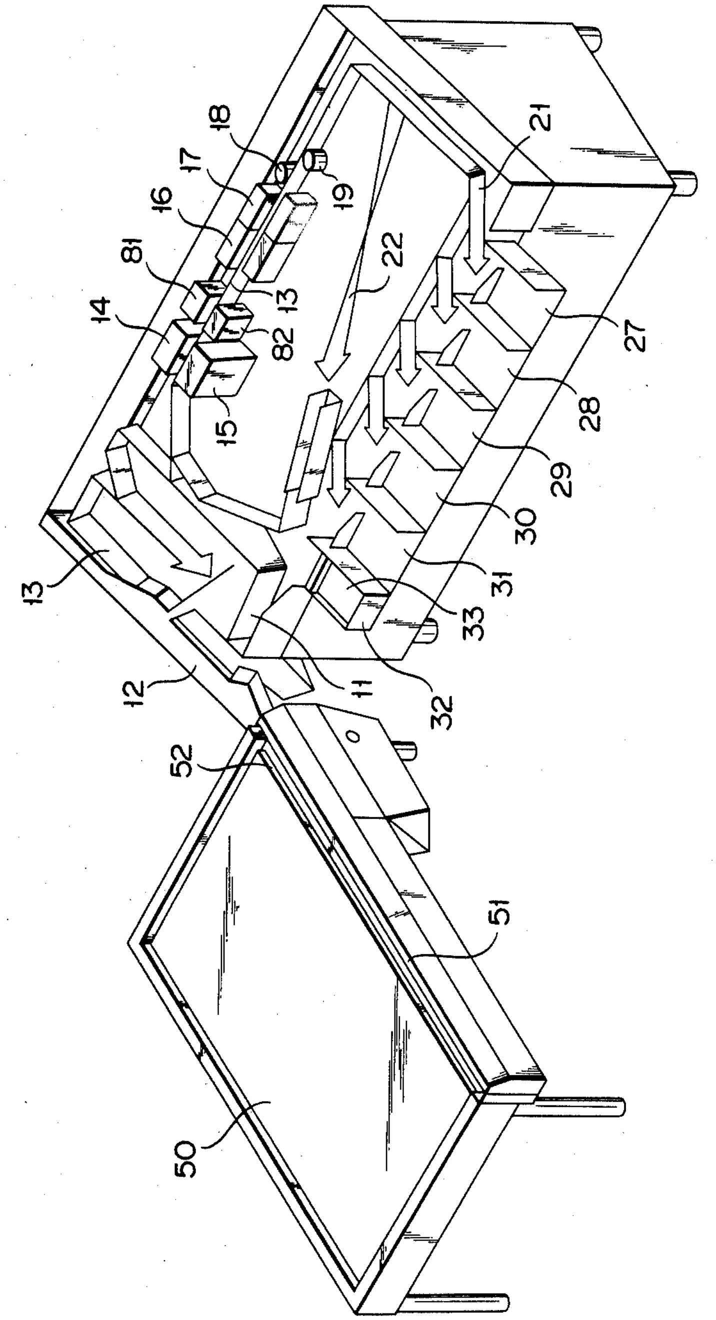
FIG. 3 is a simplified perspective view of a postal matter alignment/stamping apparatus which may be employed with the teachings of the subject invention.
Figure 4:
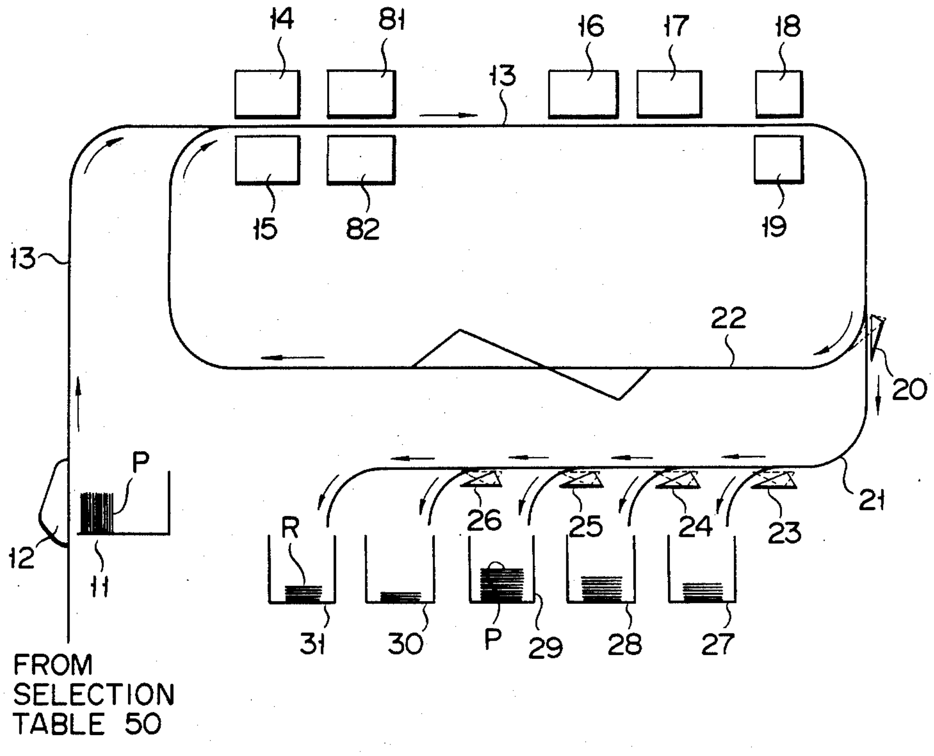
FIG. 4 is a simplified schematic of the apparatus of FIG. 3.

FIGS. 3 and 4 are a simplified perspective view and a block diagram of an alignment/stamping apparatus which may be employed with the teachings of the invention. Envelopes P, FIG. 4, are placed on sorting table 50 and an operator manually removes foreign matter and places the envelopes into a trough-shaped conveyance path 51 from where the envelopes are conveyed to pick-up section 12 via sorting section 52. Pick-up section 12, one at a time, picks up the envelopes supplied from either sorting section 52 or supply section 11 using a suction chamber (not shown). In this way envelopes P are conveyed in an upright position along conveyance path 13.

Figure 6:
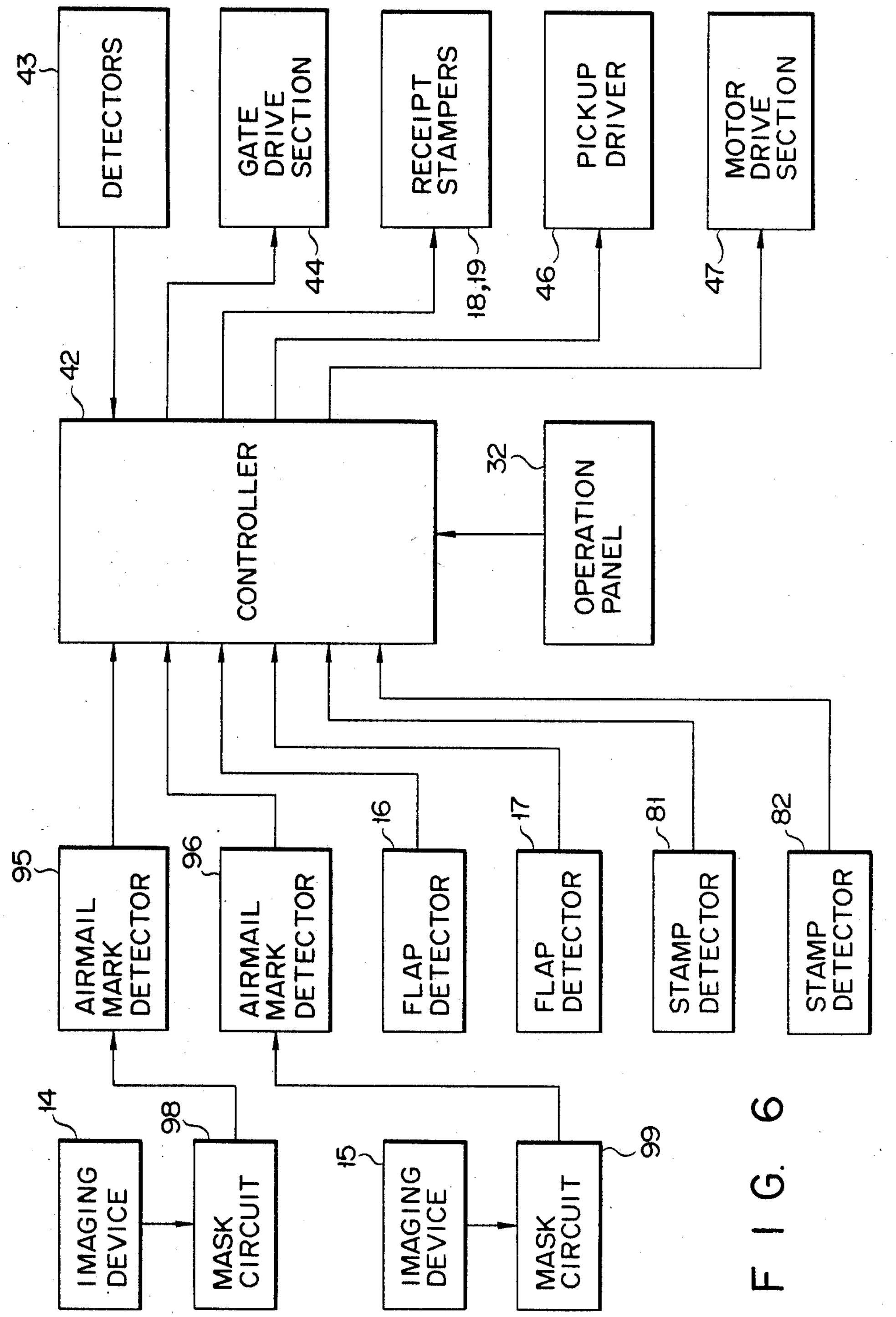
FIG. 6 is a circuit diagram of a first embodiment of the subject invention.

Envelopes P are conveyed along conveyance path 13 passed imaging devices 14 and 15 which are located facing each other on either side of conveyance path 13. The field of view of imaging devices 14 and 15 is set large enough to cover the largest envelope to be supplied. By scanning the surfaces of each envelope, imaging devices 14 and 15 obtain image data relating to stamp 2, address 4, airmail mark 5, edge mark E, return address 8 and seal 9, etc. Image signals from devices 14 and 15 are then outputted and supplied to mask circuits 98, 99 (FIG. 6). These image signals represent a visual image of the surfaces of envelopes P.

Next, stamp 2 is detected by stamp detectors 81 and 82 which are facing each other on either side of conveyance path 13. Stamp detectors 81 and 82 detect the characteristics of the stamp such as standardized color, fluorescent or phosphorescent light, and detect whether the stamp is attached either to the left or right of center. In an alternative embodiment, stamp 2 may be detected by analysis of the image signals from imaging devices 14 and 15.

Next, flap detectors 16 and 17 are provided on one side of conveyance path 13 to detect the presence of flap 7 on the reverse of the envelope.

Figure 5A:
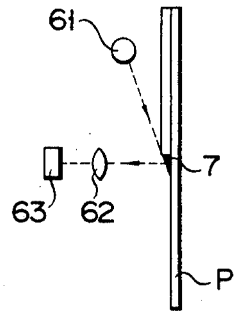
FIGS. 5A and 5B show the structure of a flap detector which may be employed with the teachings of the subject invention.
Figure 5B:
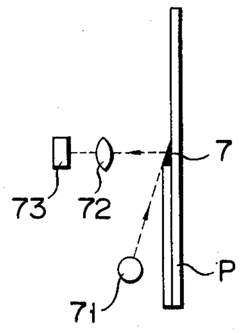

An example of flap detectors 16 and 17 is shown in FIGS. 5A and 5B. Flap detector 16 comprises light source 61, which radiates a diagonal beam on the surface of the envelope starting at the top, and line sensor 63 for photographing the surface of envelope P through lens 62. Flap detector 16 detects whether the envelope is facing upward by detecting a resultant shadow of the flap from the output of line sensor 63. Similarly, flap detector 17 comprises light source 71, which radiates a diagonal beam on the surface of the envelope starting at the bottom, and line sensor 73 for photographing the surface of envelope P through lens 72. Flap detector 17 detects whether the envelope is facing downward by detecting a resultant shadow.

A receipt stamp confirming the receipt of the envelope is then stamped onto the reverse side by receipt stamper 18 or 19 which are positioned facing each other on either side of conveyance path 13.

The envelope having passed receipt stampers 18 and 19 now is guided by gate 20 at the end of conveyance path 13 to sorting conveyance path 21 if it can be determined in which direction the envelope is facing or, if it is right side up or upside down. The envelope is guided to inverter conveyance path 22, if the above result could not be obtained. Envelopes guided to inverter conveyance path 22 are inverted and then are guided back to conveyance path 13 at a point before imaging devices 14 and 15. Envelopes guided to sorter path 21 are guided to collection bins 27, 28, 29, 30 and 31 by gates 23, 24, 25, and 26, respectively, based on the detection results.

The envelopes whose orientation was determined are sorted into separate bins 27, 28, 29, 30 and rejected envelopes or envelopes that were inverted in inverter path 22 but whose orientation still could not be determined are collected in bin 31. The decision of whether a side is obverse or reverse is determined by stamp 2, address 4 and airmail mark 5, etc. being on the obverse of the envelope and flap 7 being on the reverse of the envelope. Whether the envelope is right side up or not is determined by stamp 2 being in the upper right hand corner when the envelope is right side up and being in the lower left hand corner when the envelope is upside down, and/or by the orientation of the flap. By combining these four states, it is possible to determine complete orientation of the envelope. Operation panel 32 is provided beside reject collection bin 31. Various switches 33 for controlling the alignment/stamping apparatus are provided on operation panel 32.

FIG. 6 is a circuit diagram of a first embodiment of the present invention. Image signals from imaging devices 14 and 15 have prescribed portions masked (eliminated) by masking circuit 98 and 99 and the resultant masked image signals are supplied to airmail mark detectors 95 and 96.

Airmail mark detectors 95 and 96 detect airmail mark 5 by determining whether a blue signal is received over a prescribed period based on the supplied masked image data, and detects whether the mark is in the right or left half of the envelope. Based on these results, airmail mark detector 95 supplies signals indicating the obverse of the envelope and that the envelope is up/down to controller 42. Similarly, airmail mark detector 96 sends a signal indicating the reverse of the envelope and that the envelope is up/down to controller 42.

Controller 42 determines in which direction the envelope is facing and whether it is right side up or upside down based on the obverse and up/down signal from airmail mark detector 95, the reverse and up/down signal from airmail mark detector 96, stamp position signals from stamp detectors 81 or 82 and flap detection signals from flap detector 16 or 17.

Controller 42 controls gate drive section 44 in response to the selection of switches 33 on operation panel 32, the obverse/reverse detection results, the up/down detection results and the detection signals from conveyance detector 43 provided on the different conveyance routes. Gates 20, 23, 24, 25, 26 are switched based on the control of gate drive section 44. Controller 42 drives receipt stampers 18 and 19 in response to the obverse/reverse detection results and the up/down detection results to place a receipt stamp on the reverse of the envelope, and controls pick-up driver 46, which drives pick-up device 12. Controller 42 also controls motor drive section 47 to drive conveyors 13, 21, 22, 51.

Figure 7:
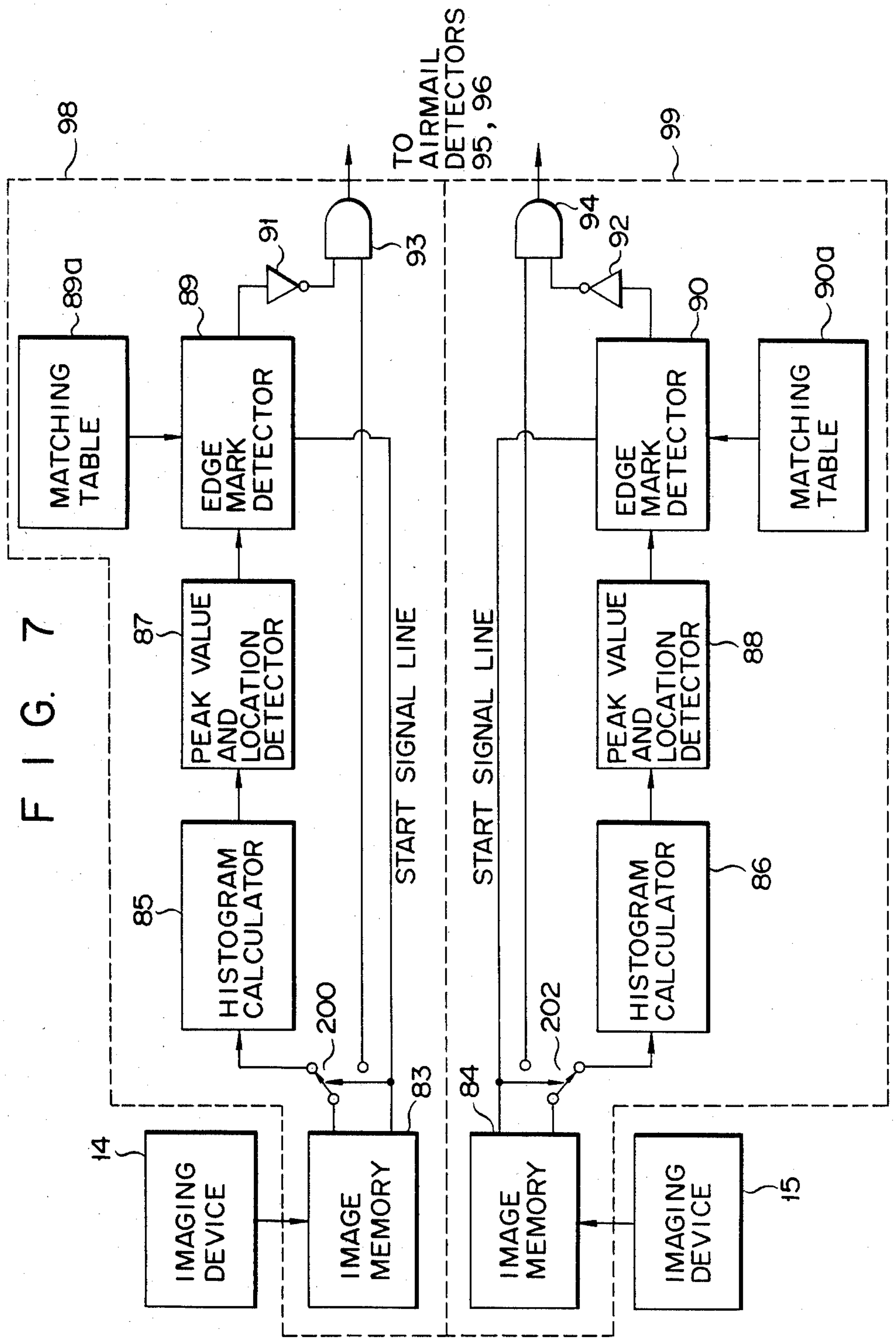
FIG. 7 is a detailed circuit diagram of the mask circuits shown in FIG. 6.

FIG. 7 is a detailed circuit diagram of mask circuits 98, 99 shown in FIG. 6. The image signals from imaging devices 14, 15 are supplied to image memories 83, 84, respectively, wherein the image data covering both sides of the envelope is stored. The outputs from memories 83, 84, are first supplied through switches 200, 202 to histogram calculators 85, 86 which set edge mark detection areas bounded by lines c, d, e, f (one-dot broken line in FIG. 1) and g, h, i, j (one-dot broken line in FIG. 2). These edge mark detection areas may contain edge marks that could interfere with an orientation analysis of the envelope. A histogram of each edge mark inside each edge mark detection area is calculated.

Figure 8A:
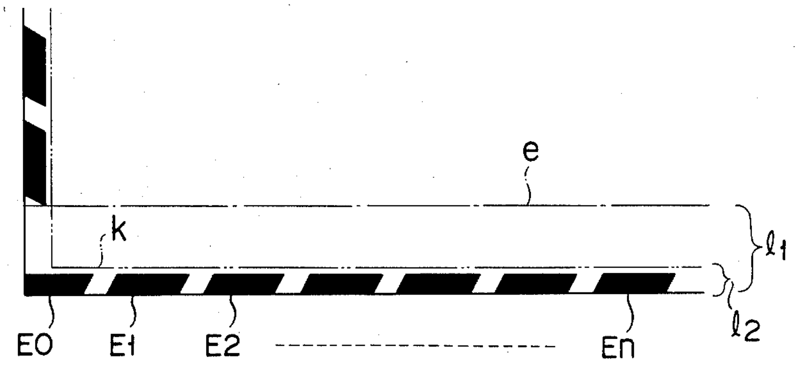
FIGS. 8A to 8D illustrate edge mark detection principles according to the first embodiment of the invention.
Figure 8B:
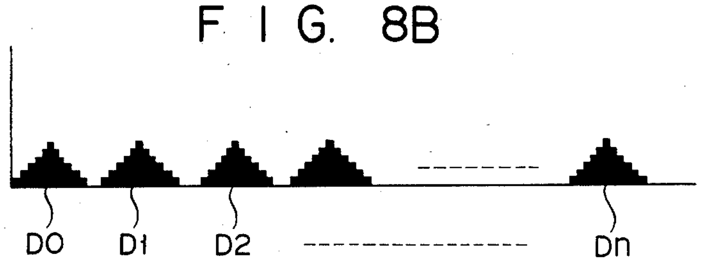

For example, for the edge mark detection area bounded by line e and the lower edge of the obverse side of an envelope as shown in FIG. 8A, and a histogram such as that shown in FIG. 8B is obtained for the edge marks $E_0$, $E_1$, . . . $E_n$. The height $1_1$ (distance from the edge of the envelope to each line bounding the edge mark detection area) of each edge mark detection area is set to include the highest edge mark that will be supplied to the apparatus. The outputs of histogram calculators 85, 86 are supplied to peak value and location detectors 87, 88.

Figure 8C:
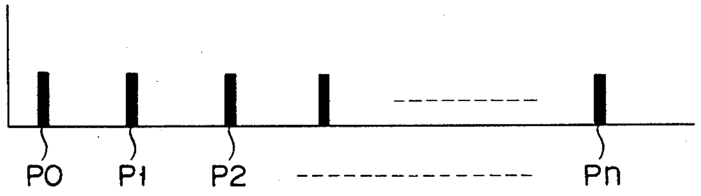

Peak value and location detectors 87, 88 determine the peak values of each histogram $D_0$, $D_1$ . . . $D_n$ of each edge mark supplied from histogram calculators 85, 86 and their repetition rates and/or positions. Obviously since either the repetition rate or the coordinate positions of the edge marks determines the location of the edge marks, the term "location" should be deemed generic to both repetition rates and position. For example, with a histogram such as that shown in FIG. 8B, the peak values for the different histograms $D_0$, $D_1$ . . . $D_n$ and their positions $P_0$, $P_1$ . . . $P_n$ are shown in FIG. 8C. Peaks of a histogram are often flat. However, in this case the central coordinate is deemed to be the peak coordinate $P_0$, $P_1$ . . . $P_n$. The outputs of peak value detectors 87, 88 are supplied to edge mark detectors 89, 90.

Figure 8D:
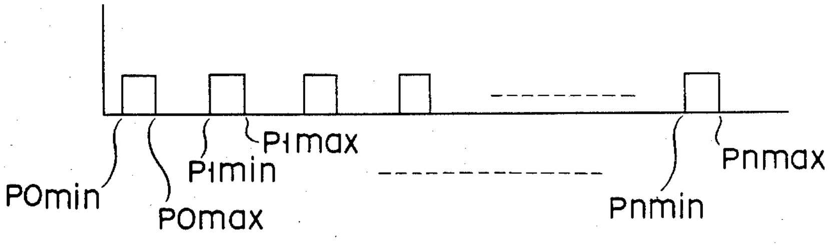

Edge mark detectors 89, 90 determine whether each repetition rate and/or position $P_0$, $P_1$ . . . $P_n$ of the peak value of the histogram for each edge marking $E_0$, $E_1$ . . . $E_n$ of each edge mark detection area supplied from the respective peak value detectors 87, 88 is within the limits of a characteristic location pattern of a standard edge marking (FIG. 8D) stored in matching tables 89*a*, 90*a*. In other words, a match is determined between the location of peak values $P_0$, $P_1$ . . . $P_n$ and the range of coordinates ($P_{0min}-P_{0max}$, $P_{1min}-P_{1max}$, . . . ) of the characteristic reference edge pattern shown in FIG. 8D. Based on this decision, edge mark detectors 89 and 90 determine whether the period of repetition of the peak values of the histogram is constant or not. When this period of repetition is determined to be constant and match characteristic reference locations, an edge mark is determined to be present.

Various patterns which have coordinate limits that include the periods of various edge marks plus tolerance range may be stored in tables 89*a* and 90*a* as the characteristic reference edge patterns.

Ideally, only when all of the coordinates $P_0$, $P_1$ . . . $P_n$ of the peak values of the histogram are within the coordinate limits of a characteristic reference pattern is it determined that the edge mark is present. However, in practice, the peak values of the histogram within the coordinate limits of the reference pattern may be counted, and it is determined that an edge mark is present based on whether a prescribed number is reached by that count.

When it is determine by edge mark detectors 89, 90 that there is an edge mark within an edge mark detection area, the distance $1_2$ from edge of the envelope to the average or maximum value of each mark for each edge mark detection area is determined. This distance $1_2$ for each corresponding edge defines an area of the envelope image which contains an edge mark that may interfere with an orientation analysis of the envelope. Normally, the maximum peak value of the edge mark as determined by the corresponding histogram is used. However, when the envelope is conveyed at an angle in reference to the conveyance path, the average value of the edge mark may be used. In this way, when the edge mark is found for each edge, a limit for the edge mark shown by the two-dot rectangular line k in FIGS. 1 and 2 is obtained within which no edge mark is included.

Once these limits are determined, edge mark detectors 89, 90 output a start signal to switches 200, 202 and to image memories 83 and 84. This start signal sets switches 200, 202 to directly output the stored image signals in image memories 83, 84 to gates 93, 94. This start signal also begins transfer of the stored image signals to a first input of gates 93, 94. At the same time these image signals reach a first input of gates 93, 94 the edge mark detectors 89, 90 in combination with inverters 91, 92 output a logic 0 signal to a second input of gates 93, 94 when image signals outside the line k limits are read out of image memories 89, 90, and a logic 1 signal to the second input of gates 93, 94 when the image signals that are read out to the first inputs of gates 93, 94 are within the line k limits. Thus, these output signals of edge mark detectors 89, 90 are masking signals. Gates 93, 94 may actually be AND circuits and the inputs from detectors 89, 90 may be inverted by inverters 91, 92 when necessary to achieve the proper masking effect.

As a consequence of the foregoing, of the image data supplied from image memories 83, 84 to gate 93, 94, only image data corresponding to the area bounded by limit k is outputted from gates 93, 94. The outputs from gates 93, 94 are supplied to airmail mark detectors 95, 96, respectively.

Figure 9:
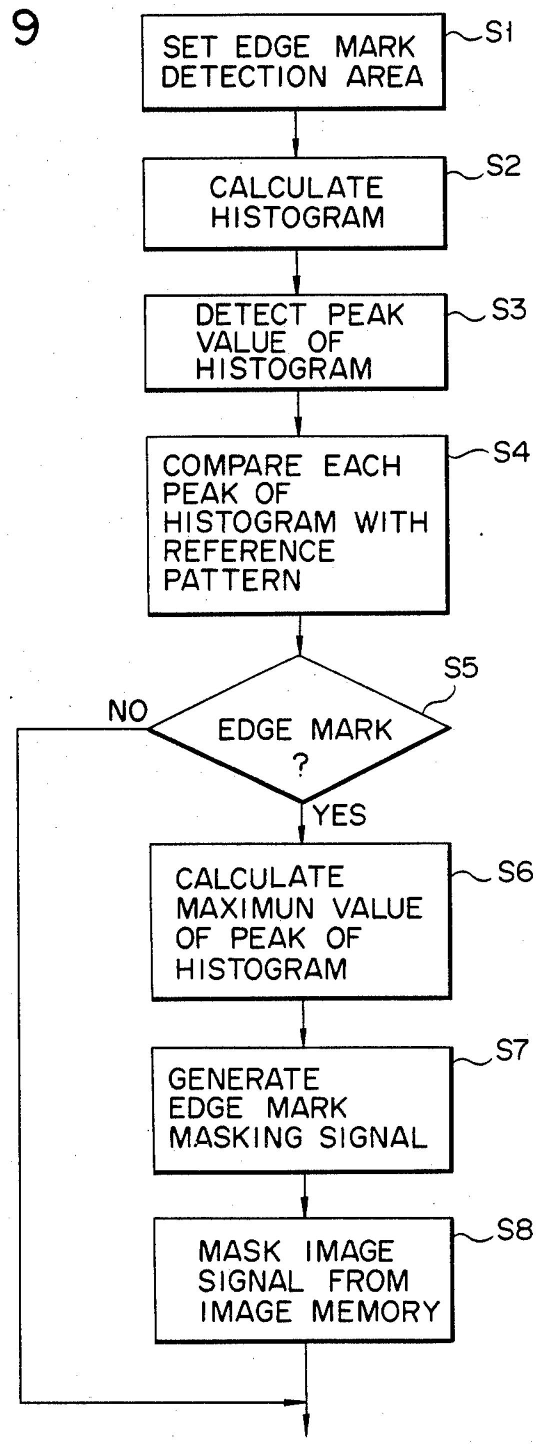
FIG. 9 is a flow chart showing the operation of the first embodiment.

The operation of the first embodiment is described with reference to the flow chart shown in FIG. 9. First, the operation of pick-up device 12 begins together with the start of each of conveyor paths 13, 21, 22. Pick-up device 12 picks up one envelope at a time of the envelopes supplied from sorting table 52 or from supply section 11. These envelopes are transmitted by conveyance path 13. The image signals regarding all surfaces of each conveyed envelope are read and supplied to image memories 83, 84 from where image data is supplied to histogram calculators 85, 86. Histogram calculators 85, 86 set the prescribed height of the edge mark detection areas c, d, e, f, g, h, i, j for each of the four edges in the supplied image data (Step 1).

The histograms $D_0$, $D_1$ . . . $D_n$ of each edge mark $E_0$, $E_1$ . . . $E_n$ within each edge mark detection area are detected and the detected histograms are sent to peak value and location detectors 87, 88 (Step 2). For example, as shown in FIG. 8A in relation to edge marks $E_0$, $E_1$ . . . $E_n$ provided on the lower edge of an obverse side and the histograms $D_0$, $D_1$ . . . $D_n$ shown in FIG. 8B are obtained for these edge marks $E_0$, $E_1$ . . . $E_n$.

For each edge mark $E_0$, $E_1$ . . . $E_n$ of each edge mark detection area, peak value and location detectors 87, 88 find the density distribution; i.e., the peak value of histograms $D_0$, $D_1$ . . . $D_n$ and the position coordinates, which are then supplied to edge mark detector 89, 90 (Step 3). For example, with the histograms shown in FIG. 8B, the peak values for histograms $D_0$, $D_1$ . . . $D_n$ and their coordinates $P_0$, $P_1$ . . . $P_n$ are obtained as shown in FIG. 8C.

Edge mark detectors 89, 90 determine whether the coordinates of each peak value for each edge mark $E_0$, $E_1$ . . . $E_n$ of each edge mark detection area are within the coordinates of the characteristic reference edge patterns stored in matching table 89a or 90a by comparing the two (Step 4), and determining whether the number of edges within those coordinates reaches a specified number to thereby determine whether edge marks are present (Step 5). In other words, when peak values such as that shown in FIG. 8C are supplied, each is checked to determine whether its coordinates $P_0$, $P_1$ . . . $P_n$ are within the corresponding characteristic reference edge pattern coordinates ($P_{0min}-P_{0max}$, $P_{1min}-P_{1max}$, . . . $P_{nmin}-P_{nmix}$).

When edge mark detectors 89, 90 determine that an edge mark is present in an edge mark detection area, edge mark, detectors 89, 90 then determine the height from the edge of the envelope which corresponds to the average or maximum value of each peak for each edge mark, to determine edge mark area (Step 6), and by determining the edge mark area for each edge mark detection area, it is possible to obtain the area to be masked, i.e., the line "k" limits shown in FIG. 1 and line "1" limits shown in FIG. 2. Based on these results, edge mark detectors 89, 90 supply masking signals to the one input terminal of AND circuits 93, 94 via inverters 91, 92 (Step 7). At this time the outputs from image memories 83, 84 are supplied to another input terminal of AND circuits 93, 94. Thus, only image data within range "K" or "1", is not masked by the signals from edge mark detectors 89, 90, and is supplied to airmail detectors 95, 96 from AND circuits 93, 94 (Step 8).

Airmail mark detectors 95, 96 detect airmail mark 5 by determining whether a blue signal covers a prescribed area from the supplied masked image data and also generate an airmail-mark-position detection signal which indicates whether the mark is in the left half or right half of the envelope. In other words, airmail mark detector 95 supplies an obverse decision signal and an up/down decision signal to controller 42 and airmail mark detector 96 supplies a reverse decision signal and an up/down signal to controller 42.

Stamp 2 of the envelope conveyed along path 13 is detected by stamp detector 81 or 82 along with whether the stamp is positioned to the right or left of center, and these detection results are supplied to controller 42. The flap on the envelope is then detected by flap detectors 16, 17 and this detection result is supplied to controller 42.

When controller 42 decides the envelope is right side up and the reverse side of the envelope faces the flap detectors on the decision signals supplied to controller 42 from airmail mark detector 95 together with signals from stamp detector 81, indicating that a stamp is present and that the stamp is on the right hand side, controller 42 drives gate drive section 44 and each gate is switched so that the envelope is stamped by receipt stamper 19 and sent to collection bin 27.

When controller 42 decides the envelope is upside down and reverse side of the envelope faces the flap detectors based on the decision signals supplied to controller 42 from airmail mark detector 95, controller 42 drives gate drive section 44 and each gate is switched so that the envelope is stamped by receipt stamper 19 and sent to collection bin 28.

Accordingly, when controller 42 decides the envelope is right side up and obverse side of the envelope faces the flap detectors based on the decision signals supplied to controller 42 from airmail mark detector 96 together with signals from stamp detector 81 indicating that a stamp is present and that the stamp is on the right hand side, or based on the flap detection signal from detector 16, controller 42 drives gate drive section 44 and each gate is switched so that the envelope is stamped by receipt stamper 18 and sent to collection bin 29.

When controller 42 decides the envelope is upside down and the obverse side of the envelope faces the flap detectors based on the decision signals supplied to controller 42 from airmail mark detector 96 together with signals from stamp detector 82 indicating that a stamp is present and that the stamp is on the right hand side, or based on the flap detection signal from detector 17, controller 42 drives gate drive section 44 and each gate is switched so that the envelope is stamped by receipt stamper 18 and sent to collection bin 30.

When controller 42 cannot arrive at a decision with regard to the direction and side of the envelope in the above process, controller 42 switches gate 20 to resupply the envelope to conveyance path 13 via inverter conveyance path 22 and goes through the decision process for the same envelope once more. If, in the second decision process, the direction and side can still not be determined, the envelope is sent separately to reject collection bin 31.

As can be understood from the above, edge mark detection and masking makes possible the detection of airmail mark, stamp and address information, etc., from the image data in which image data the portion corresponding to the edge mark has been eliminated so even if any part of the stamp, address or airmail mark overlap the edge mark, accurate detection is still possible, thereby improving the decision ability. Also, the range within which the address is written is restricted so that later processing, such as address reading and recognition, are also improved.

The above is one example of an edge mark detection system incorporating the teachings of the subject invention. However, this invention is not limited to this one embodiment, and other systems are also certainly possible. The actual means for airmail mark, flap, and stamp detection are not limited to those described above. It is also possible for detection of the flap and stamp to be based on image signals from the image device. In this case, the detection accuracy for the flap and stamp can also be improved if an image signal is used that has the edge mark masked.

In the above example the postal material to be read was directed especially to overseas airmail envelopes, but orientation analysis of packages, parcels or securities is also possible.

The following is a description of another embodiment of the invention. The parts corresponding to parts described in the first embodiment have been given the same reference numerals and a description of each such part has been omitted.

Figure 10:
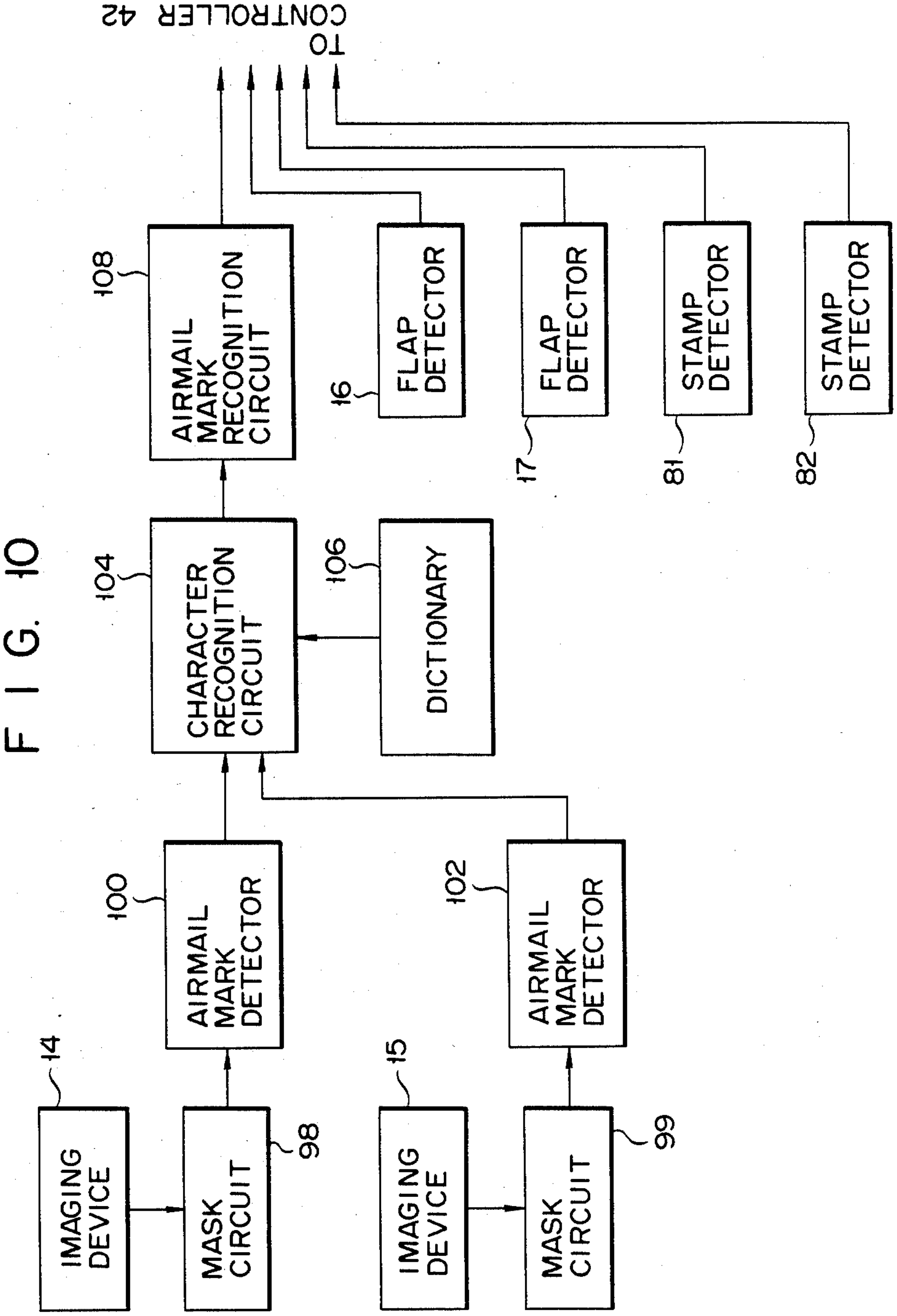
FIG. 10 is a circuit diagram of the main parts of a second embodiment of the invention of the subject invention.

FIG. 10 is a circuit diagram of a second embodiment. In the first embodiment, imaging devices 14, 15 outputted image data concerning all of the colors. However, in the second embodiment, filters, etc. are provided to filter out all colors except blue in regard to the airmail mark so that only a blue component signal is outputted. The outputs from image devices 14, 15 are supplied to airmail mark detectors 100, 102 via mask circuits 98, 99.

Airmail mark detectors 100, 102 produce a block pattern based on whether the blue signal, of the image data output from mask circuits 98, 99, is concentrated within a certain range or not. Detectors 100, 102 then detect candidate blocks that are considered possible airmail marks, as well as detect each character in the candidate block of the airmail mark, perform normalization, sample, and supply the resultant detection signals to character recognition device 104.

The character information in the block considered a possible airmail mark and supplied from airmail mark detector 100, 102, i.e., each character pattern, is recognized by character recognition circuit 104 by matching this character information with a reference pattern for the alphabet stored in dictionary 106. The result is then supplied to airmail mark recognition device 108. Dictionary 106 contains a reference pattern of the alphabet in the normal upright direction of the character pattern (A, B, C . . . ) as well as a reference pattern in the opposite upside down direction.

Airmail mark recognition circuit 108 determines whether the characters AIRMAIL exist in the candidate block based on the recognition result supplied from character recognition circuit 104. If these characters are present, airmail mark recognition circuit 108 determines that a particular side of the envelope is the obverse or the reverse based on the output from either airmail mark detector 100 or 102. Airmail mark recognition circuit 108 also determines whether the envelope is right side up or upside down based on the direction of the characters and supplies a signal corresponding to this result to controller 42.

If airmail mark recognition circuit 108 does not recognize an airmail mark, detection is started of each character pattern of the next airmail-mark candidate block from the airmail mark detectors 100, 102. The result of this recognition process is then sent to controller 42. The remainder of the structure of the second embodiment is essentially the same as that of the first embodiment.

The following is a description of the operation of the second embodiment. As in the first embodiment, one envelope at a time is transported along conveyance path 13. Imaging devices 14, 15 read only the blue data on each side of the envelope conveyed along this path and supply these blue signals to airmail mark detectors 100, 102 via mask circuits 98, 99 which eliminate the edge mark data. Airmail mark detectors 100, 102 then detect which block is a candidate block for airmail mark 5 from the data that has been supplied, and together with starting detection of each character in the block one at a time, normalizes the detected character data, samples it, and supplies it to airmail mark recognition circuit 104.

The character information in the block considered a possible airmail mark and supplied from airmail mark detector 100, 102, i.e., each character pattern, is recognized by character recognition circuit 104 by matching it with the reference pattern stored in dictionary 106 for the alphabet. Dictionary 106 contains a reference pattern of the alphabet in the normal upright direction of the character pattern (A, B, C . . . ) as well as a reference pattern in the opposite upside down direction. This result is then supplied to airmail mark recognition device 108.

Next, if airmail mark recognition circuit 108 has determined that an airmail mark is present, circuit 108 also determines the direction of the envelope based on the recognition result supplied from character recognition circuit 104. Airmail mark recognition circuit 108 determines the side of the envelope based on which of airmail mark detectors 100, 102 the output came from, determines the up/down direction based on whether the AIRMAIL mark is right side up or upside down, and supplies an obverse/reverse and an up/down signal to controller 42. For example, if the right side up characters AIRMAIL are recognized from the output of airmail mark detector 100, an obverse/up signal is output, and if the characters are upside down, an obverse/down signal; if the right side up characters AIRMAIL are recognized from the output of airmail mark detector 102, a reverse/up signal; and if the characters are upside down, a reverse/down signal.

Consequently, if an envelope with the obverse side, such as that shown in FIG. 1, facing imaging device 14 is conveyed, it will be determined from the output of airmail mark detector 100 that the characters AIRMAIL are right side up so an obverse/up signal is outputted, and if an envelope with the reverse side, such as that shown in FIG. 2, facing imaging device 14 is conveyed, it will be determined from the output of airmail mark detector 102 that the characters AIRMAIL are right side up so an reverse/up signal is outputted.

Controller 42 attaches more weight to the obverse/-reverse and up/down signals supplied from the airmail mark recognition circuit 108 but also takes into consideration the detection results supplied from flap detector 16 or 17 and from stamp detectors 81, 82 in determining the orientation of the envelope. Then, based on the result, gates 23 to 26 are operated so that the envelope is collected in the appropriate collection bin 27 to 31.

As stated above, according to the second embodiment, the airmail mark is detected from the total envelope image data in which the data corresponding to the edge mark has been eliminated and by recognizing the characters AIRMAIL. Thus, there can be accurate determination of whether a particular envelope side is the obverse or reverse and whether the envelope is right side up or upside down. Consequently, it is possible to improve the accuracy of a postal mail sorting apparatus by eliminating mistaken stamping of receipt stamps and printing of bar codes on the obverse or reverse of the envelope.

Figure 11:
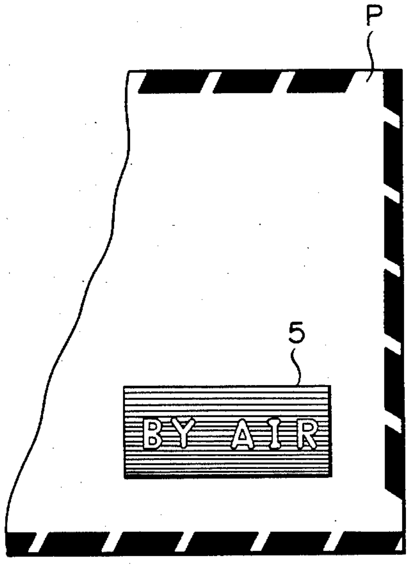
FIG. 11 shows one example of a portion of an envelope to be read by the second embodiment.

Furthermore, by extracting beforehand only the data of the color component corresponding to the color of the airmail mark and detecting the airmail mark based on this data, it is possible to perform the detection accurately. If an airmail mark such as that shown in FIG. 11 is written in white on a blue background, the same decision process can be performed simply by inverting each bit of the image signal in character recognition circuit 104.

The above was a description in which reference patterns for both right side up and upside down alphabetic characters were provided. It is possible to increase the recognition processing speed by limiting the reference patterns to the seven characters A, B, I, L, M, R, Y required by the AIRMAIL and BY AIR marks.

The preceding description was directed only to extracting the airmail mark based on a blue signal. However, the invention is not limited to this, and extraction and recognition of other colors such as red or green is also possible. In this case simply mounting suitable filters on imaging devices 14, 15 is all that is required.

Figure 12:
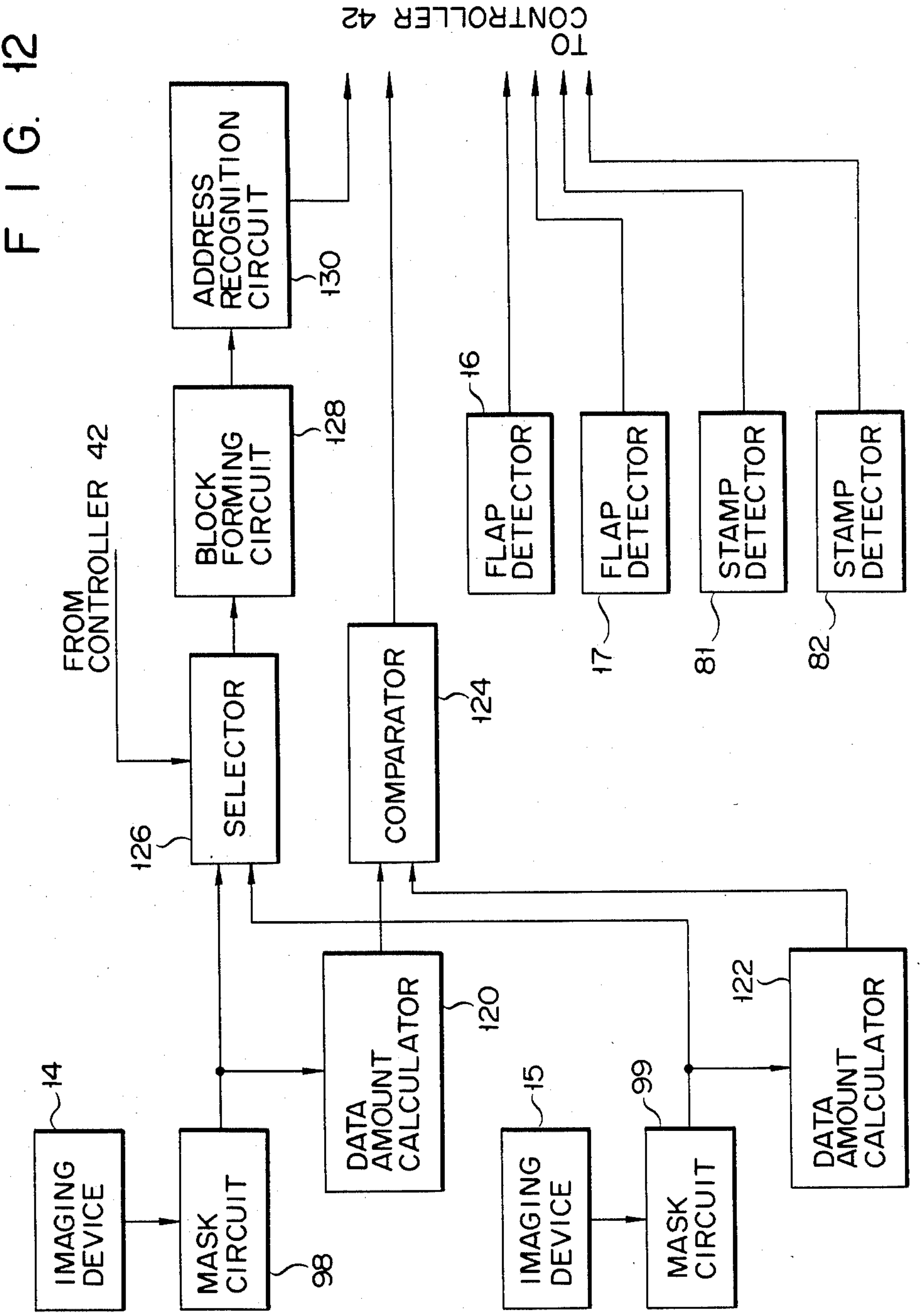
FIG. 12 is a circuit diagram according to a third embodiment of the subject invention.

FIG. 12 is a circuit diagram of a third embodiment. The same as with the first embodiment, in the third embodiment, imaging devices 14, 15 output binary image data regarding all colors on the envelope. The outputs of mask circuits 98, 99 are supplied to data amount calculators 120, 122, which comprise counters that count only logic 1 data of all the binary data received to determine the amount of data on each side of the envelope.

The outputs of data amount calculators 120, 122 are supplied to comparator 124 wherein the data volume on both sides of the envelope is compared. The side with the most data is determined to be the obverse side. If the side imaged by imaging device 14 has the most data, an obverse decision signal is supplied to controller 42, and if the side imaged by imaging device 15 has the most data, a reverse decision signal is supplied to controller 42.

Figure 13:
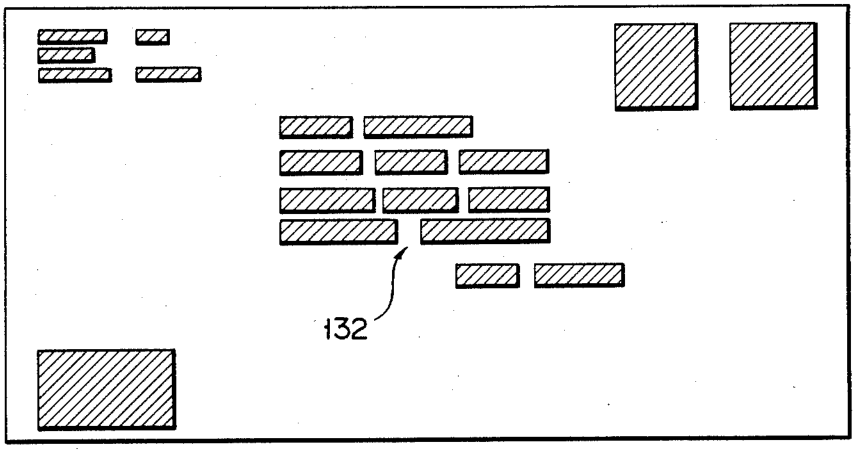
FIG. 13 shows the block pattern output from the block forming circuit according to the third embodiment of the invention.

The outputs from mask circuits 98, 99 are supplied to block forming circuit 128 via selector 126 which selects the image signal corresponding to the side determined to be the obverse based on a signal from controller 42. Block forming circuit 128 forms a block for a logic 1 image signal and supplies a block pattern such as that shown in FIG. 13 to address recognition circuit 130.

Address recognition circuit 130 recognizes a block pattern 132 that has a plurality of lines and is located in the center of the envelope, as the address block pattern and, depending on which side the block pattern is aligned (left or right), supplies an up or down decision signal to controller 42. Normally the address is written with the lines thereof aligned on the left side so if the left is aligned, the envelope is right side up, and if the right side is aligned, the envelope is upside down.

Controller 42 attaches more weight to the obverse/-reverse and up/down signals, but also takes into consideration the detection results supplied from flap detector 16 or 17 and from stamp detectors 81, 82 in determining the direction of the envelope. Then, based on the result, gates 23 to 26 are operated so that the envelope is collected in the appropriate collection bin 27 to 31.

According to the third embodiment, the block pattern of the address is recognized out of the patterns of data on the obverse side that have not been blocked. Whether the envelope is right side up or upside down is determined based on whether the lines of the block pattern are aligned on the left or right side, making possible an accurate up/down decision process. Furthermore, as the obverse and reverse sides are determined based on which side contains the most data, the obverse/reverse decision process can also be carried out accurately so the address and return address are not confused.

As was described above, according to this invention, it is possible to detect an edge mark and then eliminate the data corresponding to this edge mark from the image for the whole envelope when detecting stamp and address data, etc. This provides accurate detection, even if the edge mark is partially overlapped by either the stamp or address, etc., resulting in a reading apparatus with improved obverse/reverse and up/down decision making ability.

What is claimed is:

1. A postal material reading apparatus comprising:

first means for obtaining an image signal which represents visual images of the obverse and reverse surfaces of postal material;

second means, responsive to said image signal, for detecting the amount of data in said visual image contained on said obverse and reverse surfaces, and for determining that the surface having a greater amount of data is the observe surface;

third means, responsive to said image signal of the obverse surface, for forming a block pattern binary signal having blocks of a predetermined level to represent areas of said visual image containing data;

fourth means, responsive to said block pattern signal, for recognizing, as an address block pattern, an area in which blocks of said predetermined level are arranged in a plurality of lines and which is located in the center of the surface of said postal material; and fifth means, responsive to said address block pattern, for detecting which ends of said lines of said address block pattern are commonly aligned, and for determining that said postal material is right-side up when the left ends of said lines of said address block pattern are aligned and for determining that the postal material is upside-down when the right ends of said lines of said address block pattern are aligned.

2. An apparatus for handling postal material having a surface on which information including an address is written, comprising:

reading means for reading the information on the surface of the postal material;

address area-recognizing means, responsive to the information read by the reading means, for recognizing, as an address area, an area which is located in the center of the surface of the postal material and on which information is written in a plurality of lines; and determining means for determining the orientation of the postal material by detecting whether the lines in the address area are aligned at the right end or left end of said lines.

3. An apparatus for handling postal material having a surface on which information including an address is written, comprising:

conveyor means for conveying the postal material lengthwise along a conveyor path;

reading means, located on the conveyor path, for reading the information on the surface of the postal material;

address area-recognizing means, responsive to the information read by the reading means, for recongizing, as an address area, an area which is located in the center of the surface of the postal material and in which information is written in a plurality of lines; and determining means for determining the orientation of the postal material by detecting whether the lines in the address area are aligned at the forward or rear end of said lines with reference to the direction in which the postal material is conveyed.

* * * * *

UNITED STATES PATENT AND TRADEMARK OFFICE

CERTIFICATE OF CORRECTION

PATENT NO. : 4,736,441

DATED : April 5, 1988

INVENTOR(S) : Hirose et al.

It is certified that error appears in the above-identified patent and that said Letters Patent is hereby corrected as shown below:

Title Page, under "Inventors:" delete "Nobuyuki Hirose, Yokohama."

Signed and Sealed this

Eighteenth Day of October, 1988

Attest:

DONALD J. QUIGG

*Attesting Officer*

*Commissioner of Patents and Trademarks*